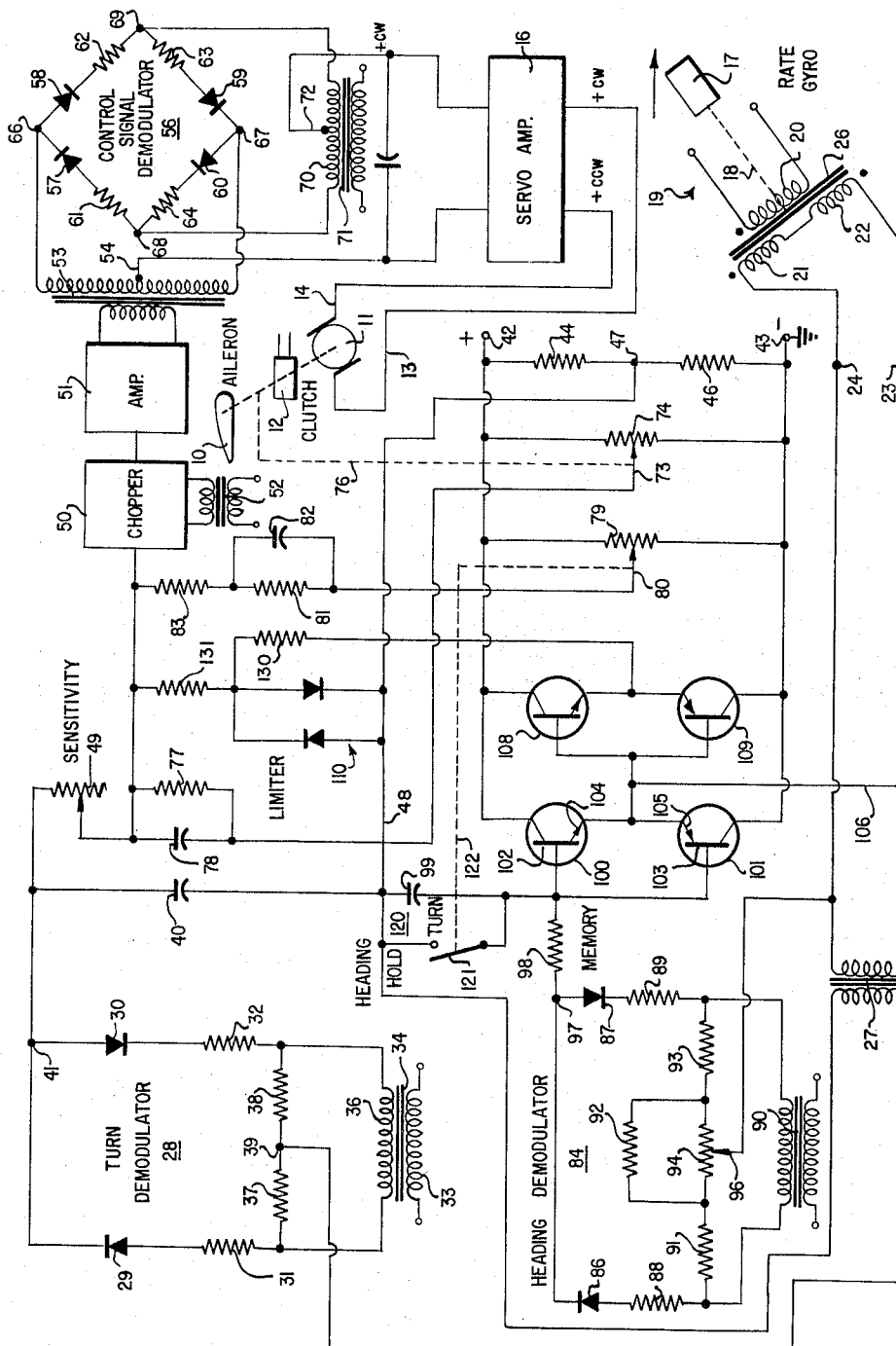

United States Patent Office 3,286,143
Patented Nov. 15, 1966

3,286,143
AUTOPILOT FOR MAINTAINING ATTITUDE AND HEADING INCLUDING RATE INTEGRATION AND MEMORY MEANS

Donald P. Kurtz, Morris Plains, and Floyd W. Piper, Denville, N.J., assignors to Aircraft Radio Corporation, Boonton, N.J., a corporation of New Jersey Filed July 31, 1962, Ser. No. 213,807
10 Claims. (Cl. 318—18)

This invention relates in general to automatic pilots for aircraft. More specifically, this invention relates to an automatic control system for aircraft which is effective to maintain the aircraft attitude along a desired course or heading.

Automatic pilots for aircraft have, of course, been known and used for many years and these have been effective to maintain attitude and flight path or heading control. However, these devices and systems have been relatively complex and require expensive components such as directional gyroscopes and the like, which render these devices unsuitable for use in general aviation.

Therefore, an object of this invention is to provide a lightweight automatic pilot for aircraft for attitude and heading maintenance which is relatively inexpensive.

Another object of this invention is to provide an automatic pilot for aircraft which includes means for effecting pilot control over the aircraft while the automatic pilot control over the aircraft while the automatic pilot is engaged.

Another object of this invention is to provide an improved method of maintaining aircraft on a selected reference heading.

The invention features a rate gyroscope for producing a signal voltage proportional in magnitude to the rate of change of the aircraft attitude about its yaw and/or roll axes and having a polarity corresponding to the direction of change. This signal voltage is applied to a control surface servo system to effect stabilization of the aircraft attitude. Normally, changes in aircraft attitude are accompanied by displacements or deviations of the aircraft from the course or heading along which it was traveling prior to an unordered change in course so that even though the aircraft attitude is stabilized, the aircraft may eventually be off of a desired or reference heading. In accordance with the invention, the rate of displacement of the aircraft from its roll and/or yaw axes is integrated and stored in a memory circuit for as long as the aricraft is off of a desired or reference heading. Furthermore, as the aircraft is returned to the reference heading, the deviation or displacement information stored in the memory is gradually cancelled by rate signals produced by the rate gyroscope through movements of the aircraft in a direction to recapture the reference heading.

Preferably, the reference heading corresponds to zero charge on an integrating capacitor in an integrating memory circuit. The instantaneous charge on the capacitor is proportional to the total displacement of the aircraft from a given reference heading and the polarity of the charge corresponds to the direction of the displacement. This storage and integrating capacitor is in a bipolar bootstrap circuit which maintains the charge on the capacitor as long as there are not rate signals applied thereto.

The invention also features a turn control comprising a zero centered potentiometer mechanically coupled to a switch bridging the integrating capacitor. This switch shorts the integrating and storage capacitor so that after the aircraft is caused to purposely change course, the integrating and storage capacitor is completely discharged to correspond to the new heading of the aircraft.

With reference to the drawing illustrating the invention as applied in its preferred form, an aileron control surface 10 is adapted to be controlled by a direct current servomotor 11 through electromagnetic clutch 12 in accordance with the polarity of the direct current voltage applied through leads 13 and 14 from the servo amplifier 16. Not shown in the drawing are the conventional control cables to the aileron 10 as well as the cabling between ailerons in each wing of the aircraft. Conventionally, the ailerons are deflected in opposite directions to effect turning and attitude control movements of the aircraft.

As is indicated, a positive direct current potential on line 13 is effective to cause clockwise rotation of servomotor 11 and a downward deflection of aileron 10, and through the aileron control cable to the aircraft control column an upward deflection of the other aileron of the aircraft. Similarly, a positive direct current potential on lead 14 effects a counterclockwise rotation of motor 11 which effects an upward deflection of aileron 10 and a downward deflection of the other aileron of the aircraft.

*Aircraft attitude control*

The rate gyroscope, indicated generally by the numeral 17, is a single axis device which is mounted at an angle between 35 and 40 degrees from horizontal so that this gyroscope is senstitive to movements of the aircraft about its roll axis as well as its yaw axis. Thus, when the aircraft attitude is changed by a sudden gust of wind or any other external cause, the output shaft 18, which is attached to the gyroscope gimbal (not shown) rotates in accordance with the deflection of the gyroscope gimbal, the direction of deflection corresponding to the direction of change of aircraft attitude and the magnitude of deflection is proportional to the rate of turn of the aircraft. As mentioned earlier, the canted angle of the gyroscope renders the gyroscope sensitive to movements of the aircraft about its roll axis as well as movements about its yaw axis so that as the aircraft attitude changes, introducing a roll or yaw rate, or both, a corresponding rotation of the element 18 results. In this connection, it should be noted that the reference attitude of the aircraft is straight and level flight.

An inductive pickoff 19, having a primary winding 20 and a pair of secondary windings 21 and 22 develops an alternating current voltage on leads 23 and 24 on changes in the coupling between the primary winding 20 and the secondary windings 21 and 22, the relative phase of which depends on the direction of roll and/or yaw. The magnitude of this voltage is proportional to the rate of change of the aircraft about its roll and/or yaw axis. The coupling between the primary winding 20 and the secondary windings 21 and 22 is controlled by the gyroscope gimbal by a movable coupling element 26. When the aircraft is in straight and level flight, coupling between the primary winding 20 and the secondary windings 21 and 22 is equal so that there is no voltage on leads 23 and 24. On changes in the aircraft attitude, introducing a roll and/or yaw rate, a corresponding deflection of the gyroscope gimbal results which causes a motion of the element 26 proportional to the rate of turn of the aircraft, to alter the coupling between the primary winding 20 and the secondary windings 21 and 22. Increased coupling between the primary winding 20 and one or the other of secondary windings 21 or 22, causes a voltage to appear between conductors 23 and 24 and the relative phase of this voltage depends on the direction of change of the aircraft attitude while the magnitude of this voltage is proportional to the rate of turn of the aircraft about its roll and/or yaw axis. Thus, if the element 26 is moved to increase the coupling between the primary winding 20 and secondary winding 21, with a concurrent decrease in the coupling to winding 22, the voltage appearing on leads 23 and 24 will be in phase, for example, with the voltage applied to the primary winding 20, while the magnitude of this voltage will be proportional to the extent of movement of element 26 from its normal position of providing equal coupling between secondary windings 21 and 22 to the primary 20. Conversely, when the element 26 is moved to provide greater coupling between the primary winding 20 and the secondary winding 22, the voltage appearing on between conductors 23 and 24 will be out of phase with the voltage applied to primary winding 20 and will have a magnitude corresponding to the deflection of element 26 away from the normal position of equal coupling between the two secondary windings 21 and 22.

Thus, the gyroscope 17 and inductive pick-off 19 produce a signal which is the resultant of the yaw (heading) and/or roll (bank) components of changes in the aircraft attitude. The polarity of this signal is governed by the direction of the change while the magnitude of the signal is proportional to the rate of change of both heading and bank angle.

Any signal appearing between leads 23 and 24 is coupled through a coupling transformer 27 to a phase sensitive detector or demodulator 28. Demodulator 28 is conventional and comprises a pair of diodes 29 and 30, current limiting resistors 31 and 32 in series with diodes 29 and 30, respectively. The primary winding 33 of transformer 34 is supplied with an alternating current reference voltage from the same supply as the primary winding 20 of inductive pickoff 19. The voltage on the secondary winding 36 of transformer 34 is applied across a pair of equal value resistors 37 and 38 and the parallel circuit comprising resistor 31, diode 29, diode 30 and resistor 32. The rate voltage coupled through transformer 27, is applied to the intermediate point 39 between resistors 37 and 38 and through capacitor 40 to point 41 of the demodulator. Conventionally, if the voltage between terminal points 39 and 41 is in phase with the reference voltage on the secondary 36 of transformer 34, the voltage at point 41 is a positive direct current voltage. Conversely, if the voltage between terminal points 39 and 41 is out of phase with the voltage in the secondary 36, then the direct current voltage appearing at point 41 has a negative polarity.

It should be noted that the voltage developed at point 41 varies in accordance with the rate and direction of movement of the aircraft about its roll and/or yaw axes. In order to render the system insensitive to changes in the supply voltage applied to terminals 42 and 43, which are connected to the aircraft direct current supply with terminal 42 being the high plus side while terminal 43 is the ground side, an imaginary or artificial ground is established for reference purposes. Thus, equal value resistors 44 and 46 are connected directly across the direct current supply terminals 42 and 43 and all polarity references, plus or minus, are made in reference to point 47 and reference buss 48.

Any voltage appearing between point 41 and the reference buss 48 is interpreted as an error signal from the rate gyroscope. If this voltage is positive with respect to the reference buss 48, the aircraft will be turned in one direction while, if the voltage is negative, the aircraft will be turned in an opposite direction, all as described more fully hereinafter. Terminal 41 is connected through a sensitivity control resistance 49 which is adjusted to limit or attenuate the output of demodulator 28 to a voltage representing approximately a standard rate of turn (180 degrees per minute).

The direct current voltage, as attenuated or limited by sensitivity resistor 49, is coupled to a transistor chopper 50 which converts the direct current signal into an alternating current signal for amplification by amplifier 51. The alternating current output voltage of the chopper varies between the value of magnitude of the direct current input error signal and zero at the rate or frequency of the supply alternating current reference as coupled into the chopper by transformer 52. Thus, the chopper 50 modulates the reference voltage applied through transformer 52 in accordance with the direct current error voltage applied to the chopper 50.

Amplifier 51 amplifies any error signal and applies same to transformer 53. The secondary of transformer 53 is center tapped at 54 to form one output lead of control signal demodulator bridge 56. Demodulator bridge 56 includes diodes 57, 58, 59 and 60 along with their associated limiting resistors 61, 62, 63 and 64, respectively. Terminals 66 and 67 of the bridge 56 are connected directly to the opposite ends of the secondary winding of transformer 53. Terminals 68 and 69 of bridge 56 are connnected to the opposite ends of secondary winding 70 of transformer 71. Transformer secondary 70 is also center tapped at 72 to form the second output terminal for bridge 56. A reference alternating current potential is applied to the primary of transformer 71 from the same source as all other alternating current reference potentials.

The operation of the control signal demodulator bridge 56 is conventional and serves to convert the modulated signal applied to transformer 53 into a direct current voltage having a polarity corresponding to the phase of the alternating current signal applied through transformer 53 and a magnitude corresponding to the modulation thereof. These potentials are amplified by a servo amplifier 16 to control the servomotor 11 in accordance with the polarity and magnitude of the potential appearing on output leads 13 and 14 of servo amplifier 16. For example, when the lead 14 is positive, the servomotor will drive in a counterclockwise direction, while if lead 13 is positive, the servomotor 11 will drive in a clockwise direction.

The wiper arm 73 of follow-up potentiometer 74 is mechanically coupled to the aileron by a gear train indicated by dotted line 76 so that the output of this potentiometer is a direct current voltage representing the aileron position and is equal in magnitude but of opposite polarity to the error signal. This follow-up voltage is coupled from the wiper arm 73 through the parallel combination of resistor 77 and capacitor 78 to the input of chopper 50.

In operation, the signal voltage from demodulator 28 effects operation of servomotor 11 to move the ailerons to the position necessary to correct for the attitude error. With the ailerons in this position, the follow-up voltage on wiper 73 of potentiometer 74 is equal in magnitude and opposite in polarity to the error signal from demodulator 28 so that the servomotor 11 stops driving. As the bank angle of the aircraft corrects towards its reference attitude, the error signal from the rate gyroscope 17 decreases so that the follow-up voltage on wiper 73, which was previously equal to the error signal, causes the servomotor 11 to drive the ailerons toward their neutral position. The aircraft flies smoothly into the desired attitude with the follow-up voltage on wiper 73 continuously reducing the aileron angle as the attitude error decreases.

Turn command control potentiometer 79 has the wiper arm thereof adapted for manual control by the pilot of the aircraft and this control permits manual control of the aircraft with the autopilot engaged. Movement of the wiper arm 80, corresponds to movement to the aileron control of the aircraft by the pilot, and introduces an error signal which is interpreted as a roll rate and/or yaw rate from the rate gyroscope 17. The turn command voltage at the wiper 80 of turn command potentiometer 79 is cancelled by an equal and opposite signal from the rate gyroscope 17 and the resulting signal voltage at the input to the chopper 50 initiates motion of the servomotor 11 and a corresponding movement of the wiper arm 73 of follow-up potentiometer 74. As discussed earlier, the voltage on the wiper arm 73 of the follow-up potentiometer 74 is effective to return the ailerons to neutral position. The control system just discussed is effective to maintain the aircraft at a reference attitude such as straight and level flight and at the same time it is capable of being adapted for direct manual control by the pilot of the aircraft.

*Circuit for maintaining aircraft on selected reference heading*

Phase sensitive demodulator 84 is substantially identical to phase sensitive demodulator 28 and includes a pair of diodes 86 and 87 and series resistors 88 and 89, respectively. A reference alternating current voltage, from the same source supplying demodulator 28, chopepr 30, and inductive pick-off 19 of the rate gyro, is applied through transformer 90 which has connected in parallel therewith, resistor 91, 92 and 93. In parallel with resistor 92 is a potentiometer 94 the upper arm of which 96 is connected directly to lead 24 coming from the secondary windings of inductive pickoff 19. As in the case of demodulator 28, demodulator 84 produces a direct current output voltage having a polarity and magnitude corresponding to the direction of displacement of the aircraft from the selected reference and a magnitude corresponding to the rate of displacement.

Resistor 98, capacitor 99, NPN transistor 100 and PNP transistor 101 form an integrating and storage device for integrating and storing the voltage appearing at point 97 of the demodulator 84. Resistor 98 and capacitor 99 integrate the rate voltage as derived by demodulator 84 to produce a voltage having a magnitude corresponding to the magnitude of deviation of the aircraft from its reference heading. Integrating capacitor 99 is connected between the reference buss 48 and the base electrodes 102, 103 of transistors 100 and 101, respectively. Initially, capacitor 99 is fully discharged and the discharged condition of capacitor 99 corresponds to the selected reference course. The total charge or voltage on capacitor 99 corresponds to the total deviation of the aircraft from the selected reference position and the polarity of this voltage corresponds to the direction of the deviation. When the potential on capacitor 99 is plus, transistor 100 conducts while when the potential on capacitor 99 is in the opposite direction, transistor 101 conducts. When one of transistors 100 and 101 conduct, the other of said transistors is held cut off by the potential on capacitor 99. The capacitor 99 is maintained charged at a voltage corresponding to the deviation of the aircraft from the selected reference for as long as the aircraft is off course. This charge on capacitor 99 is maintained through the conduction of one of transistors 100 and 101 and the connection to the commonly connected emitters 104 and 105, respectively, of transistors 100 and 101. The gain of the transistor which is rendered conductive is sufficient to produce a current equal to the discharging current of capacitor 99. This current is applied through lead 106, the primary of transformer 27 through wiper 96 and one of diodes 86 or 87 to the capacitor 99. Thus, as long as there is no corrective movement of the aircraft to regain its course, capacitor 99 will remain charged. However, the voltage on capacitor 99, whichever direction that may be, is applied through amplifying transistors 100 and 101 to emitter follower transistors 108 and 109. These emitter follower transistors are of complementary types and, like transistors 100 and 101, one of said follower transistors 108 or 109 is rendered conductive depending upon the polarity of the deviation signal, to apply a voltage corresponding to the voltage stored on capacitor 99 to the limiter 10.

Limiter 110 includes a pair of back-to-back diodes which limit the heading error signal to a value corresponding to a standard rate of turn (180 degrees per minute) which signal is applied to the chopper 50 and amplifier 51 as an error signal which causes the servomotor 11 to reposition the ailerons to turn the aircraft in the direction of the reference heading. The voltage on wiper arm 73, corresponding to aileron position is effective to balance the error signal. As the aircraft banks to return to the reference heading, the rate gyroscope 17 detects this movement to produce a rate signal which is in the opposite direction to the signal stored in the memory circuit. Demodulator 84 demodulates this rate signal and applies the demodulated signal to the integrator. Since this rate signal has a polarity opposite to the polarity of the rate signal produced on departure of the aircraft from the reference heading, the voltage on capacitor 99 is reduced accordingly so that there is a gradual reduction in the heading deviation voltage as the aircraft returns to its reference heading. The new aircraft attitude is maintained by the interrelation of the rate voltage at point 41, deviation voltage on capacitor 99 and the follow-up voltage on wiper arm 73, and the aircraft banks until it is back on the reference heading, e.g., when the voltage on capacitor 99 is substantially zero.

The integral (the voltage at the bases of transistors 100 and 101) of the rate signal for the time period $T_0-T_1$ corresponds to the displacement of the aircraft from the reference heading ($T_0$ is the time when the aircraft reparts from the reference heading and $T_1$ is the time when the aircraft is turned in the direction of the reference heading). The integral of the rate signal for the time interval $T_1-T_2$ corresponds to the displacement of aircraft towards the reference heading. Thus, the integral of the rate signals between the time interval $T_0-T_2$ is zero when the airplane is on the reference heading (where $T_2$ is the time when the aircraft is returned to its reference heading). It will be apparent that the rate of turn of the aircraft in the direction of the reference heading need not be the rate of turn of the aircraft away from the reference heading, nor is it necessary for the return rate of turn signal to be a fixed rate. However, the integrals of the departure rate signal and the return rate signal must be equal and of opposite sign or direction. Thus, the aircraft is banked at a rate sufficient to return the aircraft to its original reference heading (but limited to a standard turn of 180 degrees per minute) and the aircraft will continue to be turned until it is back on its original heading which results in a zero output from the memory. The wiper 96 of potentiometer 94 may be used to correct for small errors that may be introduced by the integrating and memory circuits.

*Establishing reference heading*

As mentioned earlier, the fully discharged condition of capacitor 99 corresponds to the desired or reference heading of the airplane. The magnitude of the voltage on capacitor 99 corresponds to the magnitude of the deviation of the airplane from its reference position while the polarity of the voltage corresponds to the direction of the deviation. Switch 120 is connected in shunt with capacitor 99. As indicated by dotted line 122 element 121 of switch 120 is mechanically coupled to the wiper arm 80 of turn command potentiometer 79. While not shown, switch 120 is a push-pull switch actuated by push-pull movement of the shaft of potentiometer 79. The arrangement is such that when wiper arm 80 of potentiometer 79 is centered and the shaft thereof pushed in, switch 120 is open and wiper arm 79 is locked in the center position. When the shaft is pulled "out" switch 120 is closed and the wiper 80 may be moved from its center position to introduce a turn command through the servo system. It will be noted that in addition to shunting capacitor 99, switch 120 connects the bases of transistors 100 and 101 to reference buss 48. In this way, the integrating and memory circuit is rendered inoperative during introduction of desired changes in the airplane heading. When the wiper arm 80 is moved to its center position and the shaft thereof pushed in, the integrating and memory circuit is operative to maintain the airplane on the newly acquired heading.

While the invention has been described by way of a preferred embodiment, it will be understood that the words used are words of description rather than of limitation, and changes within the purview of the appended claims may be made without departing from the true scope and spirit of the invention.

What is claimed is:

1. In an automatic pilot for controlling an aircraft having ailerons and a servo system for operating said ailerons, the improvement which comprises:
    means for generating a first signal having a component proportional to the rate of turn of the aircraft about its yaw axis,
    means for integrating said first signal to produce a second signal corresponding to the angle turned by said aircraft about said yaw axis,
    means for combining said first and said second signals to produce a control signal,
    and means for applying said control signal to said servo system to operate said ailerons in accordance with said control signal and cause the aircraft to turn in a direction to cause said means for generating a first signal to generate a signal to cancel said second signal.

2. In an automatic pilot for aircraft, an aileron control device for said aircraft comprising
    a servo mechanism for operating the ailerons of said aircraft,
    a rate gyroscope for generating a signal having a component at least in part corresponding to the rate of change of said aircraft about its yaw axis and at least in part corresponding to the rate of change of said aircraft about its roll axis,
    integrating means for integrating the rate of change of said first signal to produce a second signal corresponding to the deviation of said aircraft from a selected reference,
    means for combining said signals to produce a control signal,
    and means for applying any control signal so produced to said servo mechanism to operate said ailerons to cause the aircraft to turn in a direction to reduce said control signal.

3. In an automatic pilot for controlling an airplane having ailerons and a servo system for operating said ailerons, the improvement which comprises,
    means for generating a first signal voltage having a component proportional to the rate of turn of the airplane about its yaw axis;
    a circuit including a capacitor for integrating and storing said first signal voltage and producing a second signal voltage on said capacitor corresponding to the angle turned by said airplane about its yaw axis;
    combining means for combining said first and said second signal voltages to produce a control signal voltage; and
    means for applying said control signal voltage to said servo system to control said ailerons in accordance with said control signal voltage to cause the aircraft to turn in a direction to cancel the control signal voltage and means for maintaining the said second signal voltage on said capacitor in the absence of first signal voltages from the first named means.

4. The device defined in claim 3 including switch means connected in shunt with said capacitor and operable to disable said integrating and storing capacitor,
    and means for applying a turn command signal voltage to said servo system to cause the airplane to change its reference heading when said integrating and storing capacitor is disabled by said switch means.

5. The device defined in claim 3 wherein said combining means is effective to limit the control signal voltage to a value corresponding to a standard rate of turn when one or both of said first and second signal voltages is above a selected value.

6. A device for controlling an aircraft having ailerons and a servo system for controlling said ailerons comprising,
    a canted gyroscope for generating a first signal having components corresponding to the rate of change of the aircraft attitude about a pair of transverse axes relative to a given reference attitude,
    means for integrating said first signal to produce a second signal corresponding to the displacement of said aircraft from a given reference heading,
    means generating a third signal corresponding to the position of said ailerons,
    a combining circuit for combining said first, second and third signals to produce a control signal,
    and means applying said control signal to said servo system to control said ailerons in accordance with said control signal to cause the aircraft to turn in a direction and cause said gyroscope to generate rate signals of an opposite sign, applied to said means for integrating said first signal, whereby the integral of rate signals generated by said gyroscope during movements of the aircraft from the said given reference heading equals the integral of the rate signals generated by said gyroscope during movements of the aircraft to the said given reference heading.

7. The device defined in claim 6 including means for disabling said means for integrating said first signal, and
    means for applying a turn command signal to said combining circuit on disablement of said means for integrating said first signal.

8. In an automatic pilot for aircraft having ailerons and an aileron servo, aileron control apparatus comprising,
    a rate gyro responsive to turning about the yaw axis of the aircraft for generating a rate of turn signal corresponding to the direction and rate of turn of the aircraft about the yaw axis with respect to a reference heading,
    an integrator actuated by the rate signal from the gyro for integrating said rate of turn signal to produce a heading displacement signal corresponding to the angle turned by the aircraft from said reference heading,
    means for controlling the aileron servo by the combined rate of turn and heading displacement signals to bank the aircraft in a manner causing it to turn in a direction to reduce the magnitude of said heading displacement signal, whereby the time integral of rate signals generated by said rate gyro during movements of the aircraft to the said reference heading,
    and means for limiting the magnitude of said signals for controlling the aileron servo to limit the angle of bank of the aircraft relative to a normal attitude.

9. In an automatic pilot for aircraft having ailerons and an aileron servo, aileron control apparatus comprising,
    a rate gyroscope responsive to turning of the aircraft about its yaw axis for generating a signal corresponding to direction and rate of turn of the aircraft about said yaw axis,
    an integration and memory circuit actuated by the signal from said rate gyroscope to produce a heading displacement signal corresponding to the angle and direction turned by said aircraft,
    and means for controlling the aileron servo by the combined rate of turn and heading displacement signals to cause the aircraft to turn in a direction such that said rate gyroscope generates a rate signal which alone reduces the magnitude of the signal stored in said integration and memory circuit.

10. In the automatic pilot defined in claim 9, limiter means between said integration and memory circuit and said aileron servo for limiting large magnitude signal from said circuit to a selected magnitude.

(References on following page)

References Cited by the Examiner

UNITED STATES PATENTS

| | | | |
|---|---|---|---|
| 2,649,564 | 8/1953 | Meredith | 318—489 |
| 2,651,015 | 9/1953 | Meredith | 318—489 |
| 2,692,356 | 10/1954 | Milson | 318—489 |
| 2,710,729 | 7/1955 | Meredith | 318—489 |
| 2,801,059 | 7/1957 | Hecht et al. | 318—489 |
| 2,835,861 | 5/1958 | Eckhardt | 318—489 |
| 3,053,486 | 9/1962 | Auld | 318—489 |

ORIS L, RADER, *Primary Examiner.*

JOHN F. COUCH, *Examiner.*

T. LYNCH, *Assistant Examiner.*